(12) United States Patent
Lipscomb et al.

(10) Patent No.: US 6,578,807 B1
(45) Date of Patent: Jun. 17, 2003

(54) CAT LITTER SCOOP HOLDER AND SCOOP

(75) Inventors: John M. Lipscomb, Cedarburg, WI (US); Timothy B. Strandell, Racine, WI (US); Daniel J. De Lay, Waterford, WI (US)

(73) Assignee: G.H.L. International, Inc., Cedarburg, WI (US)

( * ) Notice: Subject to any disclaimer, the term of this patent is extended or adjusted under 35 U.S.C. 154(b) by 0 days.

(21) Appl. No.: 09/871,851

(22) Filed: Jun. 1, 2001

Related U.S. Application Data

(60) Provisional application No. 60/208,998, filed on Jun. 1, 2000.

(51) Int. Cl.[7] .................................................. A47K 1/08
(52) U.S. Cl. ..................................................... 248/314
(58) Field of Search ............................. 248/314, 309.1, 248/688, 222.41, 221.12

(56) References Cited

U.S. PATENT DOCUMENTS

| | | | | |
|---|---|---|---|---|
| D298,712 S | * | 11/1988 | Mattei | D6/551 |
| 5,076,627 A | * | 12/1991 | Simon | 294/1.3 |
| D329,775 S | * | 9/1992 | Murphy | D6/551 |
| D332,675 S | | 1/1993 | Simon | |
| D347,497 S | | 5/1994 | VanSkiver | |
| D360,714 S | | 7/1995 | d'Alquen | |
| 5,460,293 A | * | 10/1995 | Erickson | 220/735 |
| 5,738,020 A | * | 4/1998 | Correia | 109/51 |
| 5,738,399 A | | 4/1998 | Mitchell | |
| 5,775,258 A | * | 7/1998 | Larsen et al. | 119/161 |
| 5,855,186 A | * | 1/1999 | Larsen et al. | 119/166 |
| 6,022,058 A | * | 2/2000 | O'Rourke | 294/1.3 |
| D429,853 S | * | 8/2000 | Hammond | D30/162 |
| 6,234,549 B1 | * | 5/2001 | Brownell | 249/1.3 |
| 6,312,029 B1 | * | 11/2001 | Renforth | 294/1.3 |

* cited by examiner

*Primary Examiner*—Leslie A. Braun
*Assistant Examiner*—Kofi Schulterbrandt
(74) *Attorney, Agent, or Firm*—Boyle Fredrickson Newholm Stein & Gratz S.C.

(57) ABSTRACT

A cat litter scoop holder that includes scoop retaining walls that define a pocket for receiving a cat litter scoop. The holder includes a base upon which it sets upright. Its sides can be open to promote airflow. The pocket includes a drain. The base preferably is hollow such that it forms a chamber with the floor to help retain drainage. The holder preferably includes flanges disposed on each side of the scoop to help keep it in the pocket and constrain lateral scoop movement. One wall preferably is inclined such that it forms an acute included angle with the other wall such that a pocket of vee-shaped cross section having its apex adjacent the base is formed. This pocket construction helps keep the scoop upright. The holder can include a hinged lid that can function as a retaining wall.

26 Claims, 14 Drawing Sheets

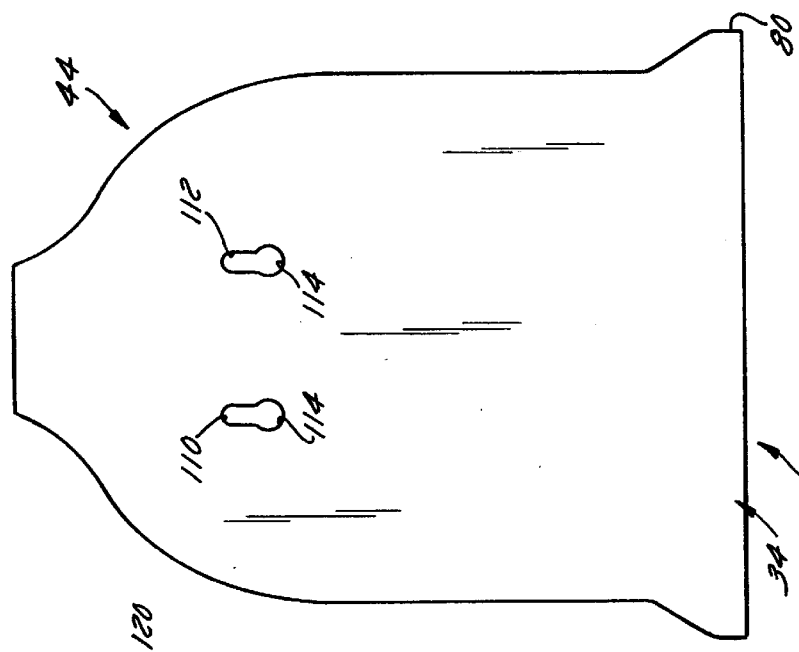
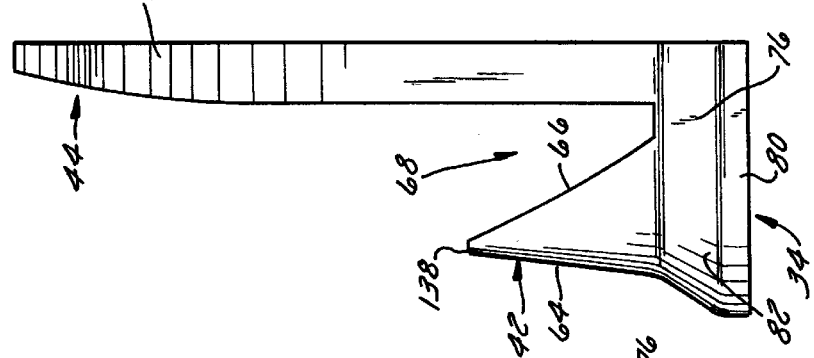
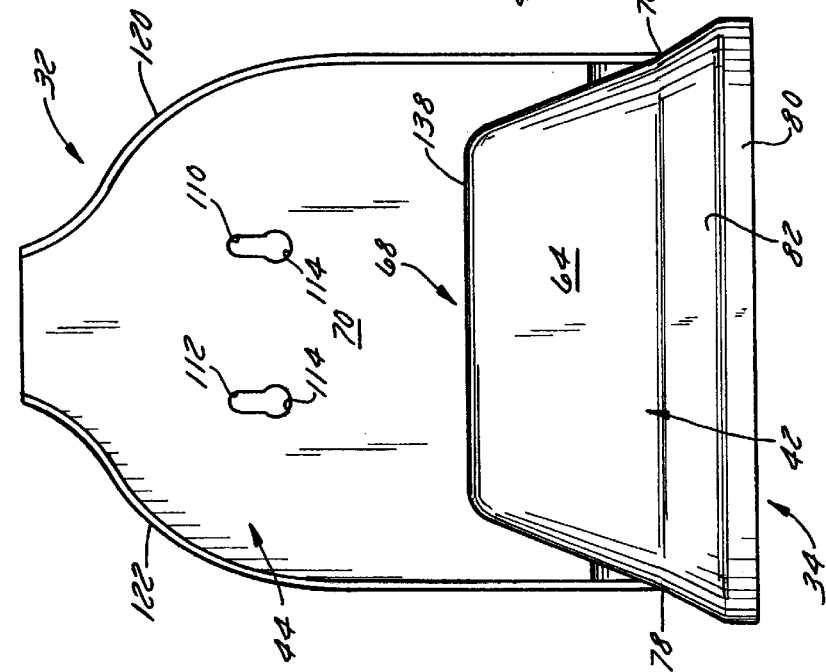

CAT LITTER SCOOP HOLDER AND SCOOP

CROSS-REFERENCE TO RELATED APPLICATION

This application claims the benefit of prior U.S. Provisional Application Serial No. 60/208,998, filed Jun. 1, 2000, that is entitled Cat Litter Scoop Holder, the entire disclosure of which is incorporated herein by reference.

FIELD OF THE INVENTION

The present invention relates generally to a cat litter scoop and holder therefor as well as to a combination of a cat litter scoop and cat litter scoop holder.

BACKGROUND OF THE INVENTION

Cat litter scoops are typically constructed with perforate or mesh walls so that clumps of fecal matter can be scooped from a litter box and separated from the cat litter in the box. Examples of these types of cat litter scoops are disclosed in U.S. Pat. Nos. 6,022,058; 5,738,399; 5,775,258; 5,855,186; and D332,675.

After using the scoop, it must be placed somewhere. Often, it is placed on the floor or back in the litter box. If placed on the floor, the scoop can cause contamination or leave a mess. If placed in the litter box, the scoop can also become contaminated or just plain dirty.

As a result, it is desired to be able to place the scoop in a holder where it will neither become contaminated nor become dirty.

SUMMARY OF THE INVENTION

The present invention provides a cat litter scoop holder that releasably receives and retains a cat litter scoop in a pocket in the holder. The holder includes a base upon which it can rest in an upright orientation on a horizontal surface, such as a floor or countertop. The base can include a larger pedestal that provides stability to help the holder resist tipping when it is disposed on a horizontal surface.

Extending upwardly from the base is a retainer wall and a rear wall that is spaced from the retainer wall, defining a scoop-receiving pocket therebetween. The retainer wall comprises a lip that can be curved and that is inclined at an acute angle away from the rear wall, imparting a vee-shaped cross-section to the pocket. In a preferred embodiment, the holder includes sides or sidewalls, each of which can have an opening that permits air to flow into the pocket and through a scoop received in the pocket to help facilitate drying of the scoop and matter deposited on the scoop. In one preferred embodiment, each opening is generally vee-shaped and can have a flange at or adjacent its apex that helps constrain, at least somewhat, side-to-side movement of a scoop received in the pocket.

The rear wall can be equipped with inturned flanges that bracket at least a portion of the scoop portion of a scoop received in the pocket to help constrain side-to-side movement of a scoop received in the pocket. In one preferred embodiment, each inturned flange hugs the outer contour of one side of at least part of the scoop portion of a scoop received in the pocket.

Where the scoop is curved or has a handle that extends forwardly beyond a concave scoop portion in a direction transverse to its longitudinal axis, the rear wall of the holder can include or comprise a spacer that is preferably is disposed adjacent the apex of the pocket.

The apex of the pocket preferably comprises a collection trough that preferably is of perforate construction to permit matter from a scoop received in the pocket to drain from the scoop and pocket. In one preferred embodiment, the collection trough is comprised of a pair of sidewalls spaced apart by a bottom wall that provides increased volume to hold matter from the scoop while still permitting the scoop to properly seat in the holder. The base or bottom of the holder preferably is hollow and defines a retention chamber that helps collect matter from the scoop that has drained from the pocket.

In one preferred embodiment, a bracket can be used to releasably mount the holder to a vertical surface, such as a wall. The bracket preferably includes a spacer and a pair of spaced apart fingers that releasably engage the rear wall of the holder. A mounting tab on the bracket can be used to attach it to the vertical surface using one or more fasteners.

The holder is particularly well suited to receive a preferred scoop embodiment that has a perforate scoop portion defined by a pair of perforate sidewalls, a perforate bottom wall, and an inclined perforate lip, and which includes a curved handle at one end. The sidewall edges preferably are disposed in or along a common plane, and the handle crosses and extends beyond the sidewall edges.

The holder can be equipped with a hinged lid and can have a curved or contoured retaining wall with curved portions that help guide and hold a scoop received in the pocket of the holder.

In one preferred scoop embodiment, the handle is comprised of two pieces. A cover piece can attach to a shank of the handle by detents, tabs, or rivets. If desired, the handle can be integrally formed of one piece.

Objects, features, and advantages of the present invention include one or more of the following: to provide a cat litter scoop holder that stands upright and retains a cat litter scoop in an upright, easy to reach position; a cat litter scoop and holder combination that is simple, easy and sanitary to use; to provide a cat litter scoop holder that presents the cat litter scoop with its handle upright so as that it is easy to reach; to provide a sanitary cat litter scoop holder; to provide a cat litter scoop holder that allows matter from the cat litter scoop to easily drain to facilitate drying of the scoop; to provide a cat litter scoop holder that is stable and that resists tipping; to provide a cat litter scoop holder that is versatile in that it can be located on horizontal and vertical surfaces and can easily be moved; to provide a cat litter scoop holder that is sanitary, yet aesthetically pleasing; to provide a cat litter scoop holder capable of accommodating many different cat litter scoops having different shapes and sizes; to provide a cat litter scoop holder and/or cat litter scoop that is easy to manufacture, lightweight, rugged, durable, reliable, economical to manufacture, and/or which is easy to assemble and use.

Various other features, advantages and objects of the present invention will be made apparent from the following detailed description and the drawings.

BRIEF DESCRIPTION OF THE DRAWINGS

Preferred exemplary embodiments of the invention are illustrated in the accompanying drawings in which like reference numerals represent like parts throughout and in which:

FIG. 6 is a front elevation view of the cat litter scoop holder;

FIG. 7 is a side elevation view of the cat litter scoop holder;

FIG. 8 is a rear elevation view of the cat litter scoop holder;

DETAILED DESCRIPTION OF AT LEAST ONE PREFERRED EMBODIMENT

Figure 1:
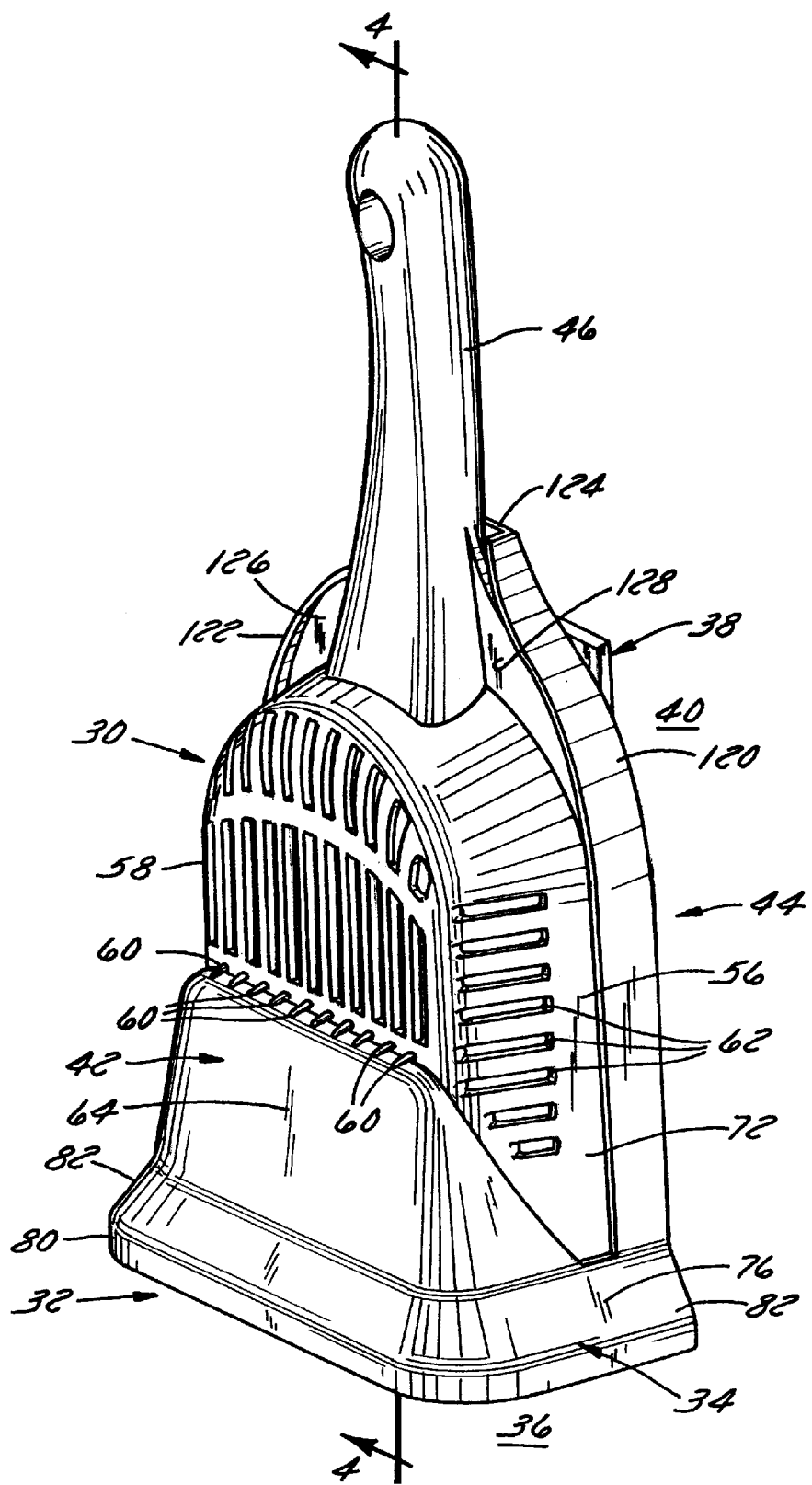
FIG. 1 illustrates a perspective view of a cat litter scoop received in a cat litter scoop holder that is mounted to a wall by a bracket.

FIGS. 1–10 illustrate a cat litter scoop 30 received in a cat litter scoop holder 32 of this invention. The holder 32 includes a base 34 that serves or functions as a pedestal 80 upon which the holder 32 stands upright when placed on a generally horizontal surface 36. The holder includes a front wall 42 and a rear wall 44 that are spaced apart so as to permit the scoop 30 be received and retained therebetween in a manner that facilitates easy removal while preferably also holding it in an upright position. In one preferred embodiment, the holder 32 also includes a bracket 38 that can be used to mount the holder 32 to a vertical surface 40.

Figure 2:
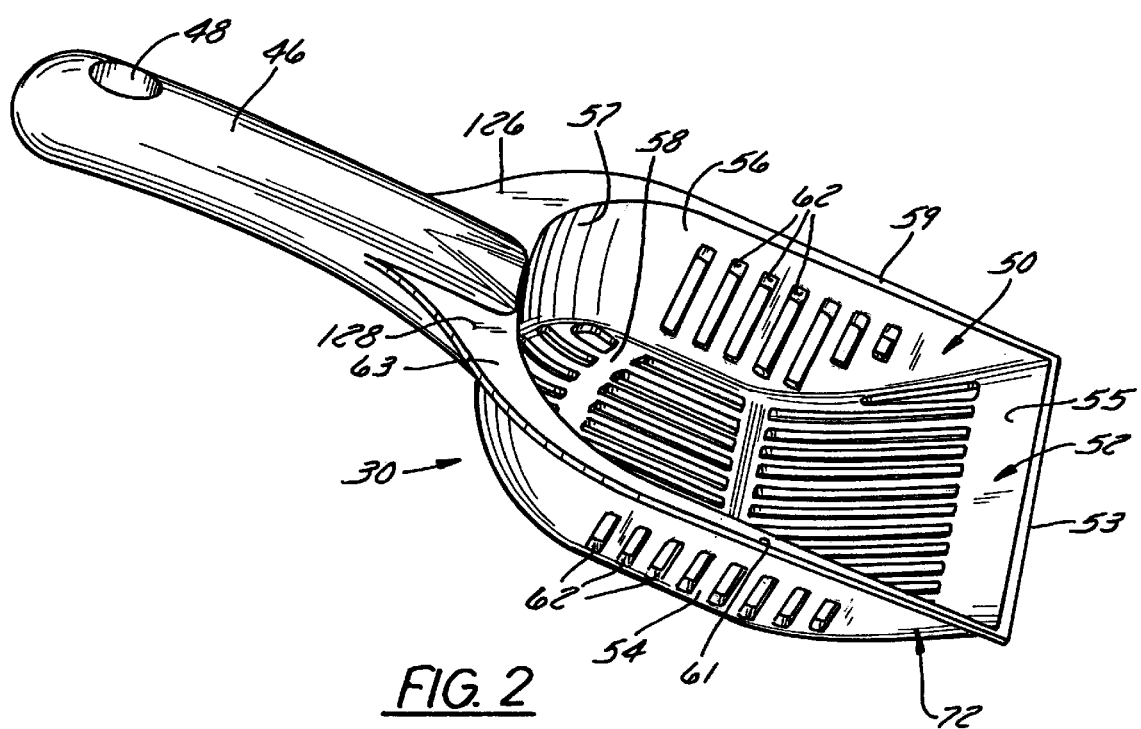
FIG. 2 is a perspective view of an exemplary cat litter scoop.

FIG. 2 illustrates a preferred embodiment of a cat litter scoop 30. It has a handle 46 that can have a bore 48 therethrough. If desired, the handle 46 can be curved or contoured. For example, the preferred embodiment of the scoop 30 shown in FIGS. 1–4 has a curved handle 46.

Figure 3:
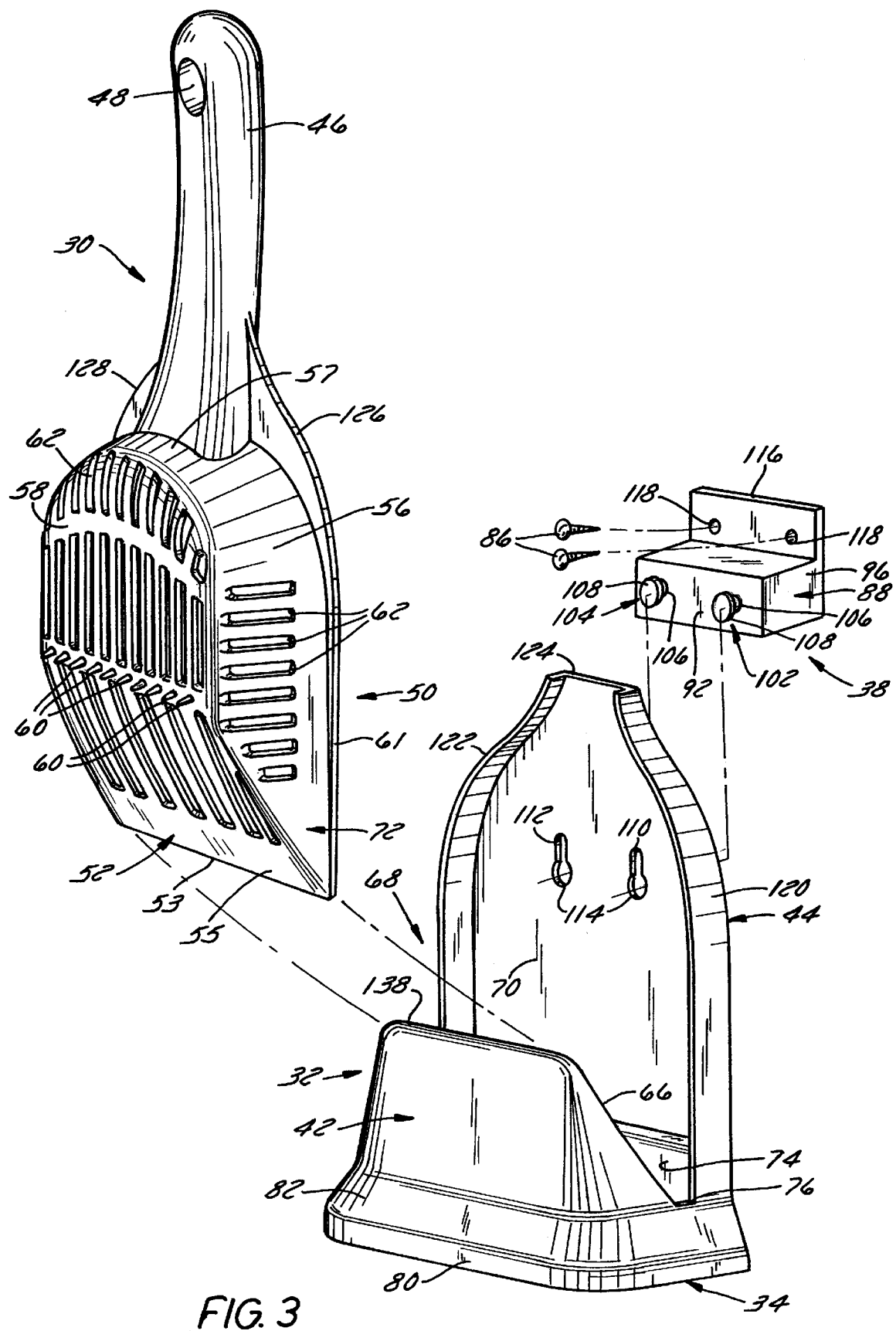
FIG. 3 illustrates a perspective exploded view of the scoop, scoop holder, and bracket.
Figure 4:
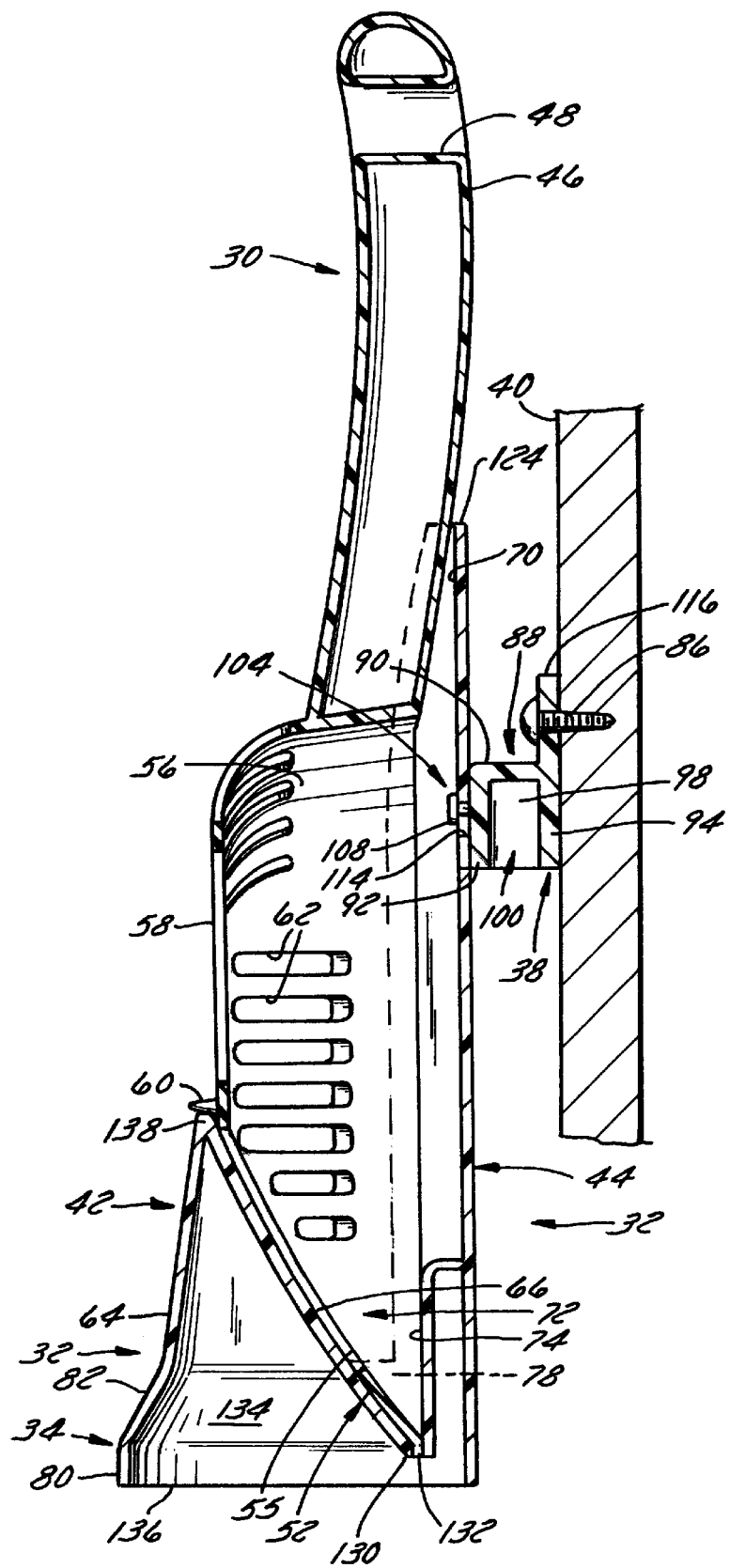
FIG. 4 illustrates a cross sectional view of the scoop, scoop holder and bracket as taken along line 4—4 of FIG. 1.
Figure 5:
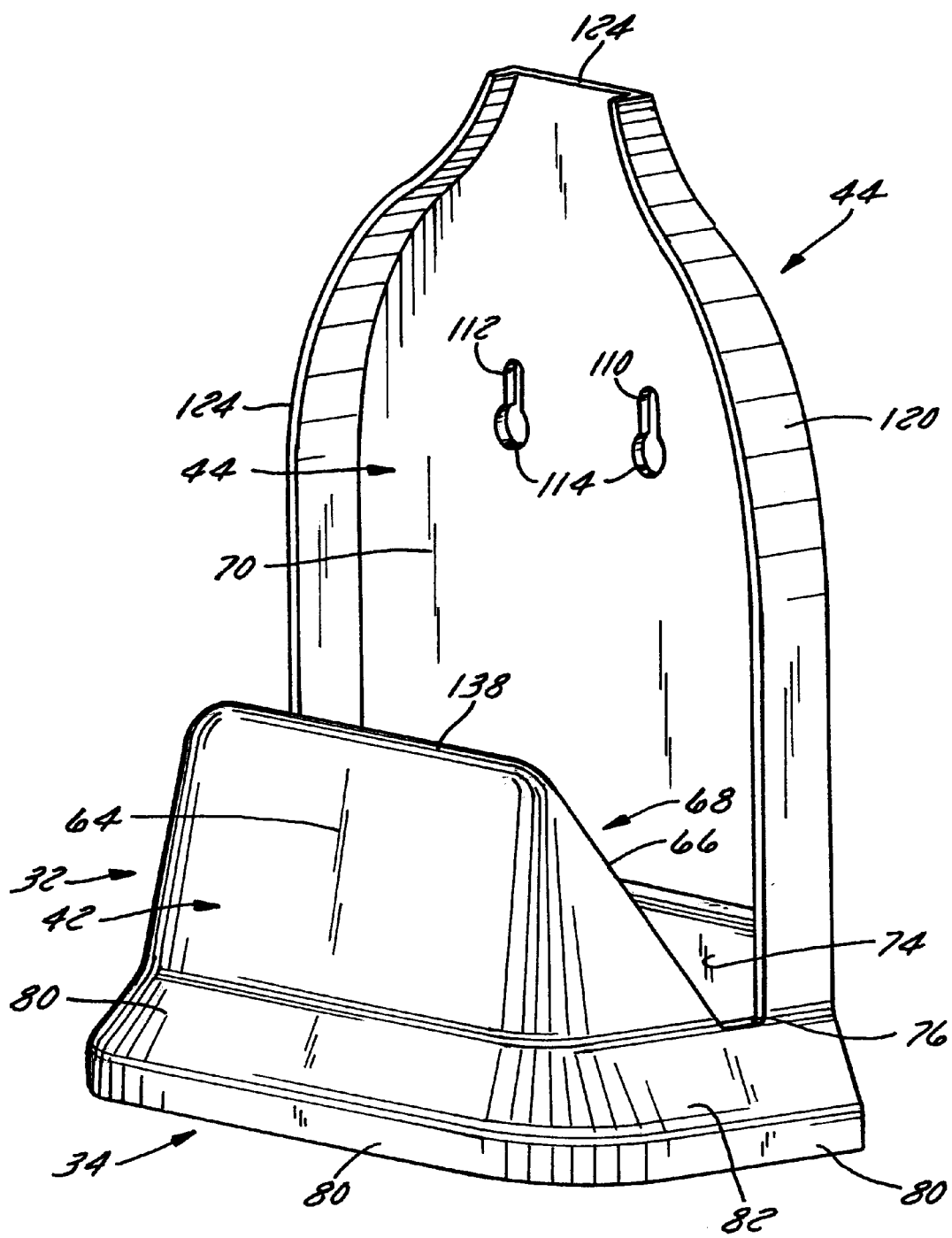
FIG. 5 is a perspective view of the cat litter scoop holder shown upstanding on a surface, such as a floor.

The scoop 30 includes a generally concave scoop portion or spoon 50 that extends outwardly from the handle 46. The scoop portion 50 includes an inclined lip or blade 52 at its free end, a pair of spaced apart and perforate sidewalls 54, 56, and a perforate bottom wall 58. If desired, the inclined lip 52 can also be of perforate construction. In its preferred embodiment, the lip 52 has a front leading edge 53 and includes a perforate panel 55 that extends to the bottom wall 58. If desired, any of the sidewalls 54, 56, the bottom wall 58 and panel 55 can be curved. For example, in the preferred scoop embodiment shown in FIG. 4, panel 55 is slightly curved. As is shown in FIGS. 1, 3 and 4, the outer surface of the bottom wall 58 can include a plurality of pairs of spaced apart outwardly projecting barbs or tines 60 that can be used to rake and smooth the cat litter after using the scoop 30.

The scoop 30 preferably is of perforate construction to enable it to separate or strain fecal matter from cat litter (not shown) in a cat litter box (not shown). This also helps minimize the loss of cat litter when cleaning the litter box. In the preferred scoop embodiment depicted in FIG. 2, the scoop 30 has many apertures, perforations, or windows 62 that each can be elongate in shape. Preferably, each scoop wall 54, 56, and 58 and the lip 52 contains a plurality of apertures 62. Each aperture 62 preferably is sized so as to permit cat litter to pass through while preventing other things that are larger than the cat litter from passing through. If desired, one or more of the scoop walls 54, 56, and 58 and the lip 52 can be of mesh construction or another type of suitable construction that facilitates the aforementioned straining or separating action.

Together, the interior surface of the perforate panel 55, the interior surface of the bottom wall 58, the interior surface of the sidewalls 54, 56, and a rear shoulder 57 form the concave scoop portion 50. Each scoop sidewall 54 and 56 preferably extends upwardly from the bottom wall 58 at an obtuse included angle (included between the interior surfaces of the bottom wall and the sidewall). The panel 55 of the lip 52 is inclined relative to the bottom wall 58 at an obtuse included angle.

As is shown in FIG. 2, each scoop sidewall 54 and 56 terminates at an edge 59 and 61. In a preferred embodiment of the scoop 30, the sidewall edges 59 and 61 are substantially coplanar. The rear shoulder 57 can also terminate in an edge 63 that can be coplanar with edges 59 and 61. In the scoop embodiment shown in FIG. 2, each of the edges 59, 61, and 63 comprises an outwardly extending flange.

The scoop holder 32 is shown in more detail in FIGS. 3 and 4. The front wall 42 of the holder 32 includes a front surface 64 and a rear surface 66. The rear surface 66 of the front wall forms a retainer lip 66 that helps receive and retain a scoop, such as scoop 30, in a pocket 68 between the retainer lip 66 and an interior surface 70 of the rear wall 44. The pocket 68 preferably is constructed and arranged to retain the scoop 30 in an upright position relative to the holder 32.

Referring more particularly to FIG. 4, with the scoop 30 and holder 32 in the generally vertical orientation shown, gravity helps cause the nose 72 of the scoop 30 to be releasably held captive between the retainer lip 66 and the scoop-facing surface 70 of the rear scoop holder wall 44. Depending on the shape, size, and other factors relating to the construction of the particular scoop 30 that is intended to be received by the holder 32, a spacer 74 preferably is disposed between the scoop 30 and interior surface 70. When the scoop 30 is inserted into a holder 32 that has a spacer 74, a portion of each sidewall edge 59, 61 bears against the spacer 74. This preferably causes at least part of the panel 55 of the scoop lip 52 to be urged against the retainer lip 66 of the holder 32. The spacer 74 may not be needed for all types of scoops. For example, the spacer 74 is desired for the scoop 30 shown in FIG. 4 because it has a handle 46 that curves beyond the plane in which the sidewall edges 59, 61 are disposed and crosses that plane.

The retainer lip 66 can be constructed with a contour that is complementary to that of panel 55 and lip 52 of the scoop 30. For example, the retainer lip 66 show in FIG. 4 is slightly curved to generally match the curved contour of the scoop panel 55 and/or its front lip 52. If desired, the retainer lip 66 can be of straight or generally planar construction (or curved) extending in a direction from adjacent one scoop sidewall 54 to adjacent the other sidewall 56. In any event, the retainer lip 66 and the rear surface 70 of scoop holder wall 44 are constructed and arranged so as to help locate and guide a scoop 30 into pocket 68. In the preferred holder embodiment shown in FIG. 3, the retainer lip 66 extends from one scoop sidewall 54 to the other scoop sidewall 56.

Figure 9:
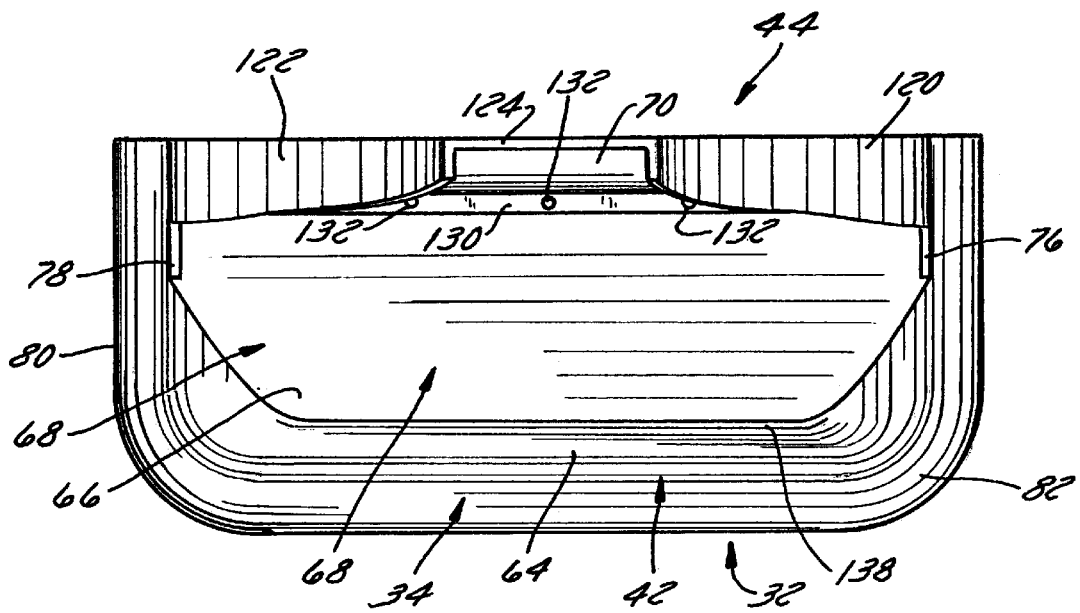
FIG. 9 is a top plan view of the cat litter scoop holder.

Referring additionally to FIGS. 6 and 9, the preferred embodiment of the holder 32 can include a pair of spaced apart flanges 76, 78 with one of the flanges 76 disposed along one side of the pocket 68 and the other one of the flanges 78 (shown in phantom in FIG. 4) disposed along the other side of the pocket 68. Each flange 76, 78 preferably extends from the retainer lip 66 to the rear wall 44. Where the holder 32 is equipped with a spacer 74, each flange 76, 78 can be constructed so as to extend from the lip 66 to the spacer 74. Together, where a holder 32 is equipped with flanges 76, 78, the flanges 76, 78 can help limit or constrain lateral or side-to-side movement of a scoop 30 received in the pocket 68.

The rear wall 44 preferably is also equipped with a pair of inturned flanges 120, 122 that flank its sides and help limit or constrain lateral or side-to-side movement of a scoop 30 received in the pocket 68. The rear wall 44, and hence the inturned flanges 120, 122, preferably are curved so as to match the peripheral shape or outer profile of an upper part of the scoop portion 50 and at least a portion of the handle 46. In the preferred holder embodiment shown in FIG. 3, the rear wall 44 is generally bell shaped. To permit clearance to accommodate a handle 46 of a scoop 30 received in the pocket 68, the top edge 124 of the rear wall 44 preferably has no flange.

The rear wall 44 and inturned flanges 120, 122 of the preferred holder embodiment shown in FIG. 3 are constructed and arranged to accommodate a scoop 30 having the depicted shape. Such a scoop 30 can be equipped with a pair of spaced apart outwardly extending and curved wings or flanges 126, 128. The holder 32 of this invention can have a rear wall 44 and flanges 120, 122 configured to accommodate the peripheral shape or outer profile of scoops having different and varied shapes.

The retainer lip 66, rear wall interior surface 70, and flanges 76, 78 are constructed such that the pocket 68 preferably is generally vee-shaped. Preferably, the lip 66, rear wall interior surface 70, and flanges 76, 78 form a pocket 68 that is open along each side to facilitate passage of air through a scoop 30 received in the holder 32. For example, referring to FIG. 1, air can flow through apertures 62 in scoop sidewall 54, inside the scoop portion 50, and through apertures 62 in scoop sidewall 56. Facilitating passage of air through a scoop 30 received in the holder 32 advantageously helps to promote drying of the scoop 30 after use, which also helps to decrease bacterial and viral contamination.

The holder 32 includes a base 34 upon which it can rest upon a horizontal surface 36, such as a floor or a counter. The base 34 includes a pedestal 80 that preferably is larger in cross section than the rest of the holder 32 to help resist tipping. The base 34 preferably includes a pitched skirt 82 that extends about the front and sides of the holder 32 from the pedestal 80 to the front wall 42 and the flanges 76, 78. As is shown in FIG. 3, the skirt 82 is pitched at an acute angle from the pedestal 80 toward the front wall 42 and the flanges 76, 78.

The holder 32 also includes an arrangement for hanging it from a vertical surface 40, such as the wall shown in FIG. 4. In its preferred embodiment, the arrangement comprises bracket 38 that mounts the holder 32 to the wall 40. The bracket 38 mounts to the wall 40 using at least one fastener 86. Preferably, the bracket 38 mounts to the wall 40 using a pair of spaced apart fasteners 86. Preferred fasteners include screws and bolts, but other types of fasteners can be used. For example, an adhesive fastener, such as double-sided tape or glue can be used.

In its preferred embodiment, the bracket 38 has an H-shaped or L-shaped cross section that includes a generally horizontally extending body 88 that spaces the holder 32 away from the wall 40. Referring to FIGS. 3 and 4, the body 88 can include a top 90, a front 92, a rear 94, and a pair of sides 96, 98 that can define an internal hollow 100 that conserves bracket material and reduces weight without significantly reducing strength.

The front 92 of the bracket 38 preferably includes at least one and preferably a pair of spaced apart fingers 102, 104 that engage the holder 32 and hold it in position. Each finger 102, 104 is formed by a peg 106 that preferably is cylindrical and which has an enlarged head 108 at its free end. Each finger 102, 104 is received in a keyway or slot 110, 112 in the rear wall 44 of the holder 32. Each slot 110, 112 has an enlarged opening or entranceway 114 at one end, preferably at or adjacent its bottom end, to accommodate insertion of a finger head 108.

The bracket 38 also includes an outwardly extending tab 116 through which each fastener 86 preferably extends. Where each fastener 86 is a bolt, a screw, a nail, a peg, or the like, the tab 116 can be equipped with one or more through bores 118.

Figure 10:
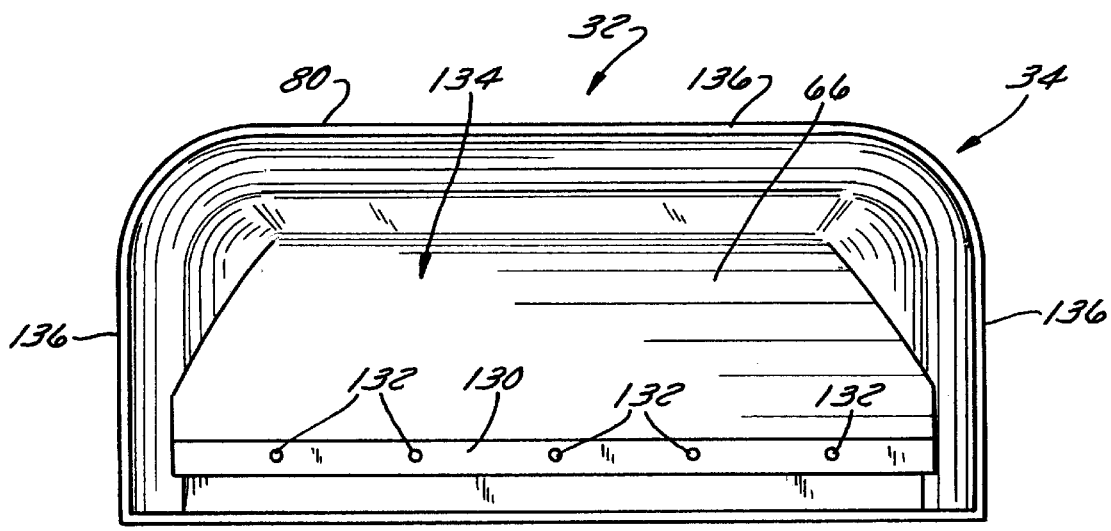
FIG. 10 is a bottom plan view of the cat litter scoop holder.

Referring to FIGS. 4, 9, and 10, the pocket 68 of the scoop holder 32 preferably also includes a collection trough 130 in which liquid and matter from a scoop 30 received in the pocket 68 collects. The collection trough 130 preferably comprises a relatively narrow channel at or adjacent the bottom of the pocket 68 at or adjacent an apex where the scoop retainer lip 66 and rear wall 44 meet. So that at least liquid will drain from the pocket 68, the trough 130 preferably is of perforate construction. For example, the preferred embodiment of the trough 130 shown in FIGS. 9 and 10 has a plurality of spaced apart bores 132 that each extend completely through the trough 130.

Referring to FIG. 4, the underside of the holder 32 preferably is hollow such that it forms a retention chamber 134 in which matter that passes through bores 132 is at least somewhat captured when the holder 32 is set on a flat surface 36. To enable matter passing through one or more bores 132 to be retained in chamber 134 when set on a flat surface, the bottom of the trough 130 is spaced above the plane in which the bottom edge 136 of the holder 32 is disposed. The holder 32 can be periodically lifted, and the surface 36 below the holder 32, e.g., the floor, can be cleaned. Where the holder 32 is mounted to the wall 40 such that its bottom edge 136 is spaced from (e.g., above) the flat surface 36, a receptacle, such as a pan, can be positioned below the retention trough bores 132 to collect matter passing through the bores 132.

Referring to FIG. 4, in operation, a cat litter scoop 30 is grasped by its handle 46 and brought toward the pocket 68 of the holder 32. Once the nose 72 of the scoop 30 is disposed between the retainer lip 66 and the interior surface 70 of the rear wall 44, the vee-shaped configuration of the pocket 68 helps guide the scoop 30 into the pocket 68 in a manner such that it will remain upright in the holder 32 once the scoop 30 is released. In fact, should the scoop 30 be released while it has not yet been fully seated in the pocket 68, the vee shape of the pocket 68 preferably will automatically guide it or slide it into the pocket 68 such that it will self-locate in a generally upright position, such as the upright position shown in FIGS. 1 and 4. Side flanges 76, 78 and inturned flanges 120, 122 help keep the scoop 30 seated in the pocket 68 and prevent the scoop 30 from laterally falling out of the holder 32.

Referring to FIGS. 1 and 4, where the scoop 30 is equipped with tines 60, the height of the lip 66 can be selected so that the tines are disposed slightly above or rest on top edge 138 of the base 34.

When a person wants to use the scoop 30, the person simply grasps its handle 46 and withdraws the scoop 30 from the holder 32. As a result of the scoop 30 being presented in the holder 32 in an upright position, less bending is required to reach the scoop 30 than if it were lying horizontal on a floor.

As a result of its pedestal construction, the holder 32, with or without the scoop 30, can be easily picked up and moved from one horizontal surface to another. As a result of providing a pedestal 80 that extends outwardly beyond the rest of its base 34 and its walls 42 and 44, the holder 32 is more stable and better resists tipping, even when being moved.

Where the holder 32 is to be wall mounted, the bracket 38 preferably is first mounted to the wall 40. In the preferred embodiment of the bracket 38 shown in FIGS. 3 and 4, screws 86 are the fasteners that are used to attach the bracket 38 to the wall 40. After the bracket 38 has been attached, the holder 32 is maneuvered such that each enlarged slot entranceway 114 overlies a head 108 of a mounting finger 102, 104. The rear holder wall 44 is then brought toward the fingers 102, 104 until each head 108 completely passes through its entranceway 114. Thereafter, the holder 32 is lowered, such as by releasing it, and the peg 106 of each finger 102, 104 slides into the narrower portion of the slot 110, 112 in which it is received. The head 108 of each finger 102, 104 is disposed against the interior surface 70 of the rear holder wall 44 after the holder 32 has been lowered creating an interference fit is between each head 108 and the wall 44. This interference fit keeps the holder 32 mounted on the bracket 38 and prevents its removal. To remove the holder 32, the holder 32 is lifted until the head 108 of each finger 102, 104 reaches a slot entranceway 114. Thereafter, the holder 32 is pulled away from the bracket 38 such that the holder 32 and bracket 38 completely separate.

Figure 11:
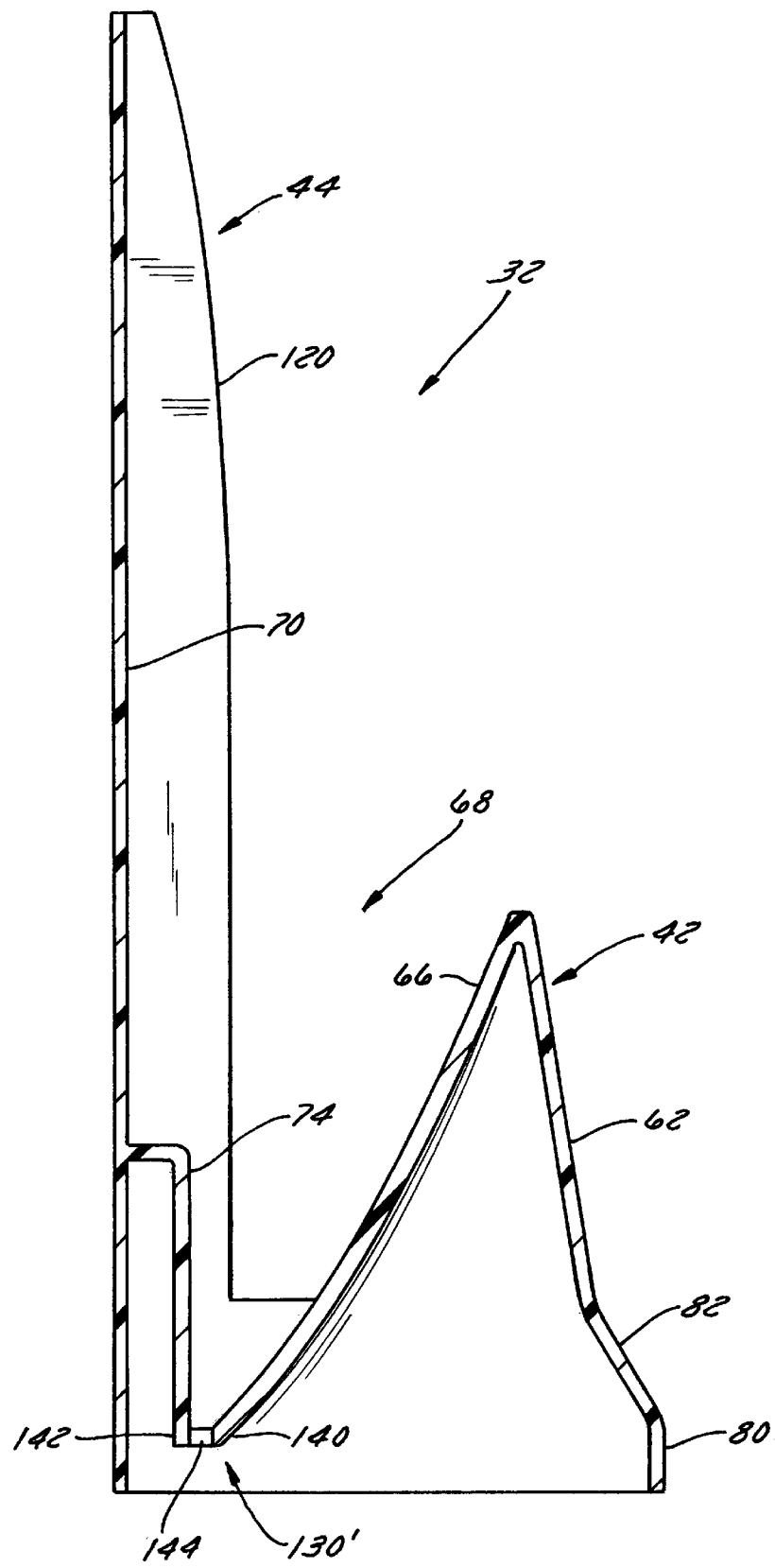
FIG. 11 is a side elevation view of a second preferred embodiment of a cat litter scoop holder that is equipped with a deeper trough.

FIG. 11 illustrates another preferred holder embodiment that is equipped with a deeper perforate trough 130' than the holder 32 shown in FIG. 4. The perforate trough 130' shown in FIG. 11 is defined by a front wall 140 and a rear wall 142 that is spaced apart by a perforate bottom wall 144. Collectively, the walls 140, 142, and 144 define a channel 130' in which matter, such as cat litter, fecal matter, etc., can be deposited. The deeper channel 130' accommodates a greater volume of such matter while still enabling the scoop 30 to seat properly in the holder 32. Scoop retaining walls 66 and 70 channel such matter and liquid from the scoop 30 into the trough 130'. Liquid can flow through the perforations in the trough 130' where it thereafter preferably can evaporate.

Figure 13:
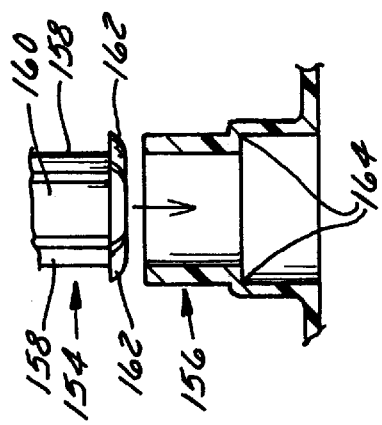
FIG. 13 is a side elevation view of a snap fit assembly used in assembly of the scoop handle shown in FIG. 12.
Figure 12:
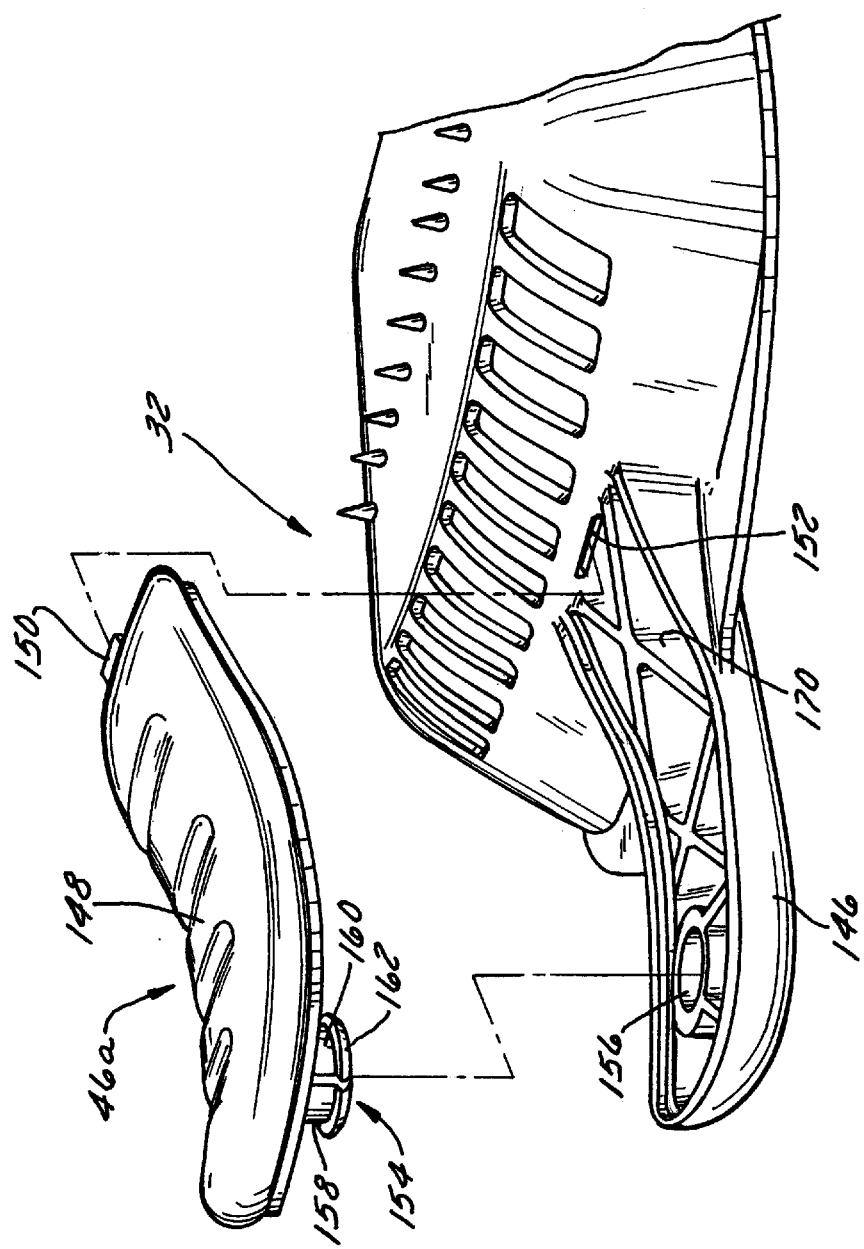
FIG. 12 is a fragmentary perspective view of the scoop depicting one preferred handle construction.

FIGS. 12 and 13 illustrate a first preferred handle assembly 46a. The handle 46a includes a shank 146 with a hand grip cover 148 that snaps onto the shank 146. In the preferred embodiment shown in FIG. 12, the cover 148 includes a longitudinally extending tab 150 that is received in a slot 152, in the holder 32. A transversely extending detent 154 extends outwardly from the cover 148 and is received in a complementary detent receiver 156 that is disposed in the shank 146. In assembly, the tab 150 is first inserted into slot 152 and the cover 148 is pivoted about the tab 150 until the detent 154 snaps into the receiver 156.

FIG. 13 depicts the detent 154 and its receiver 156 in more detail. In the preferred embodiment shown in FIG. 13, the detent 154 includes a plurality of detent arms 158, 160 that each have an outwardly facing lip 162. The detent receiver 156 comprises a bore with an outturned shoulder 164. When the detent 154 is inserted into the receiver 156, the arms 158, 160 are initially compressed and then snap outwardly when its lip 162 passes the outturned shoulder 164. Withdrawal of the detent 154 is opposed because the lip 162 of each detent arm bears against and preferably engages the outturned shoulder 164 of the receiver 156.

The hand grip cover 148 preferably is contoured, such as in the manner shown in FIG. 12. If desired, the exterior of the cover 148, as well as the rest of the handle, can be textured and can be comprised of a soft flexible material, such as rubber, that aids comfort and grip.

Figure 14:
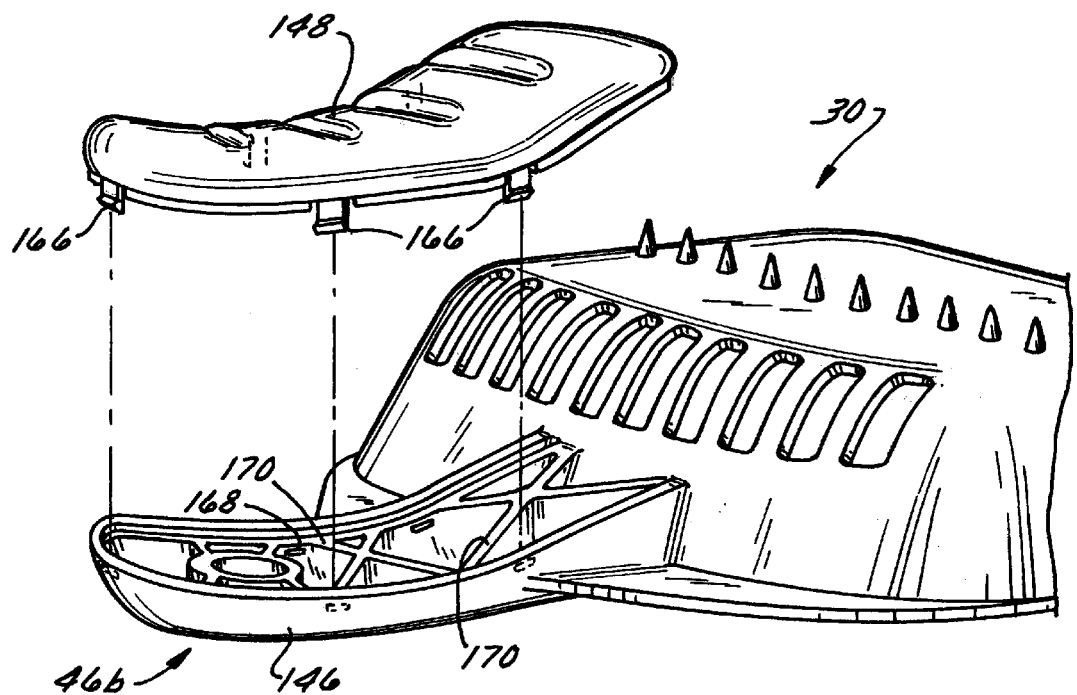
FIG. 14 is a fragmentary perspective view of the scoop depicting a second preferred handle construction.
Figure 15:
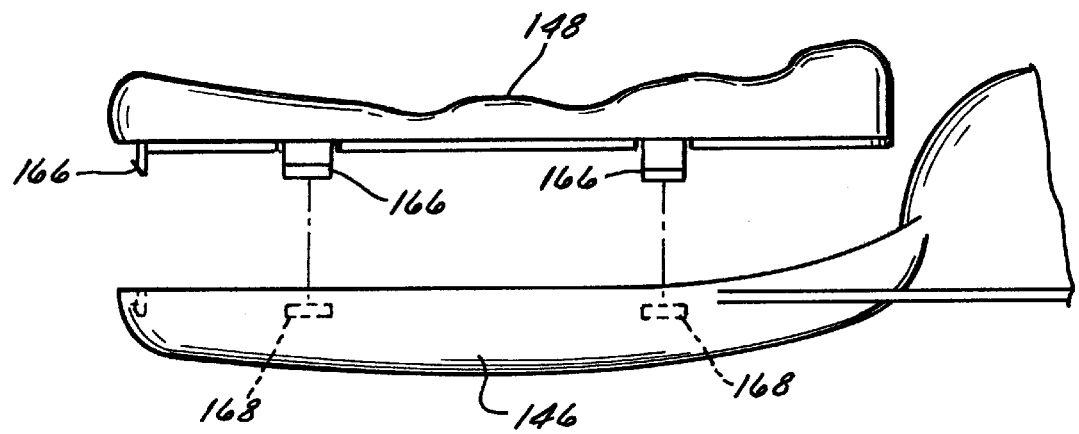
FIG. 15 is a side elevation view of a snap fit assembly used in assembly of the scoop handle shown in FIG. 14.

FIGS. 14 and 15 illustrate a second preferred handle assembly 46b. The hand grip cover 148 includes a plurality of spaced apart locking tabs 166 that are each received in a complementary pocket 168 that is disposed in an interior sidewall of the shank 146. In assembly, the cover 148 is positioned in the manner generally shown in FIGS. 14 and 15 such that it overlies a network of internal ribs 170 of the shank 146. Thereafter, the cover 148 is urged toward the shank 146 until the tabs 166 are received in their respective pockets 168 thereby engaging the shank 146. If desired, an internal ridge or rib can be used in place of pockets 168.

Figure 16:
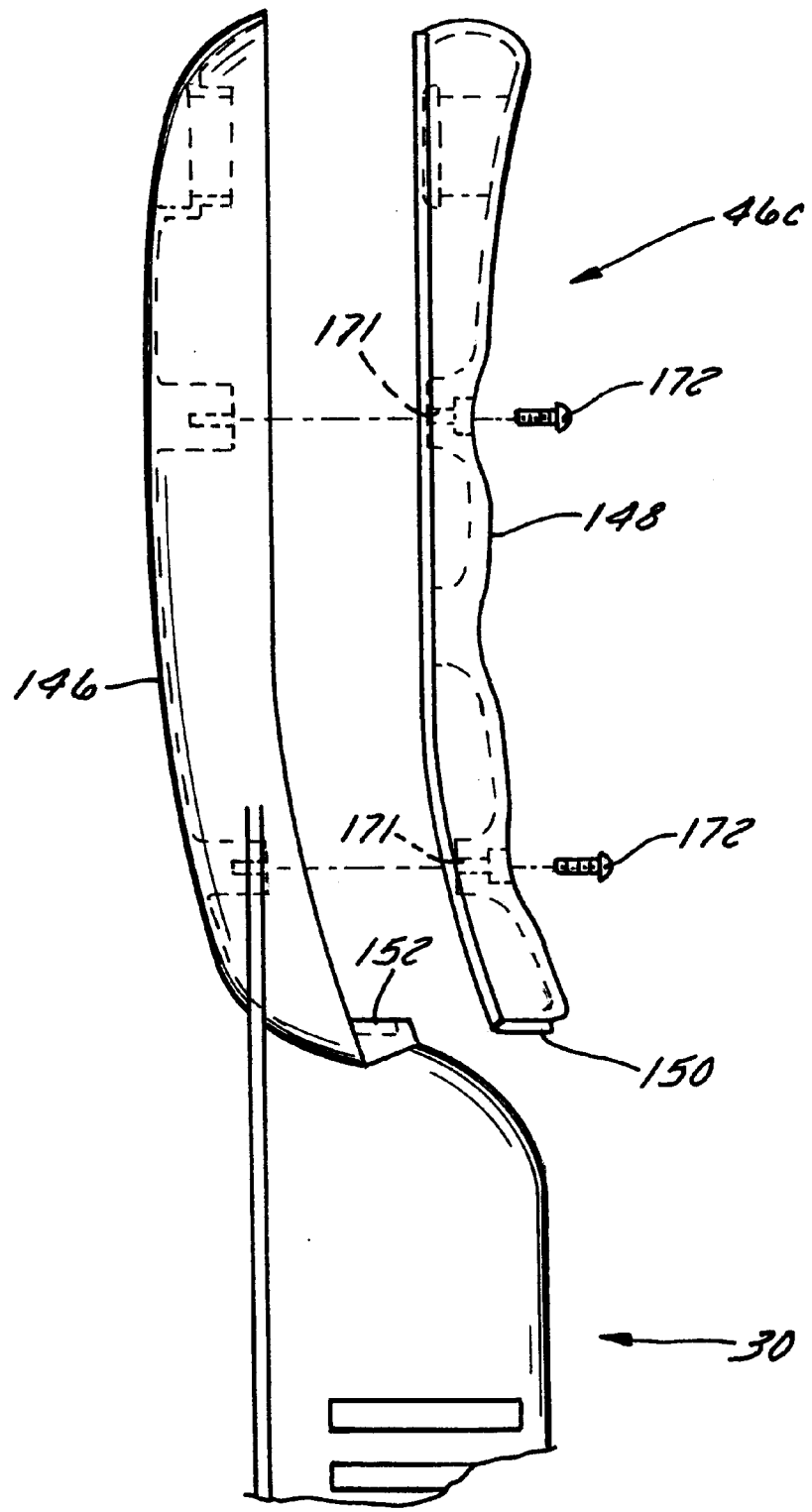
FIG. 16 is a fragmentary side view of the scoop handle illustrating another preferred handle construction.
Figure 17:
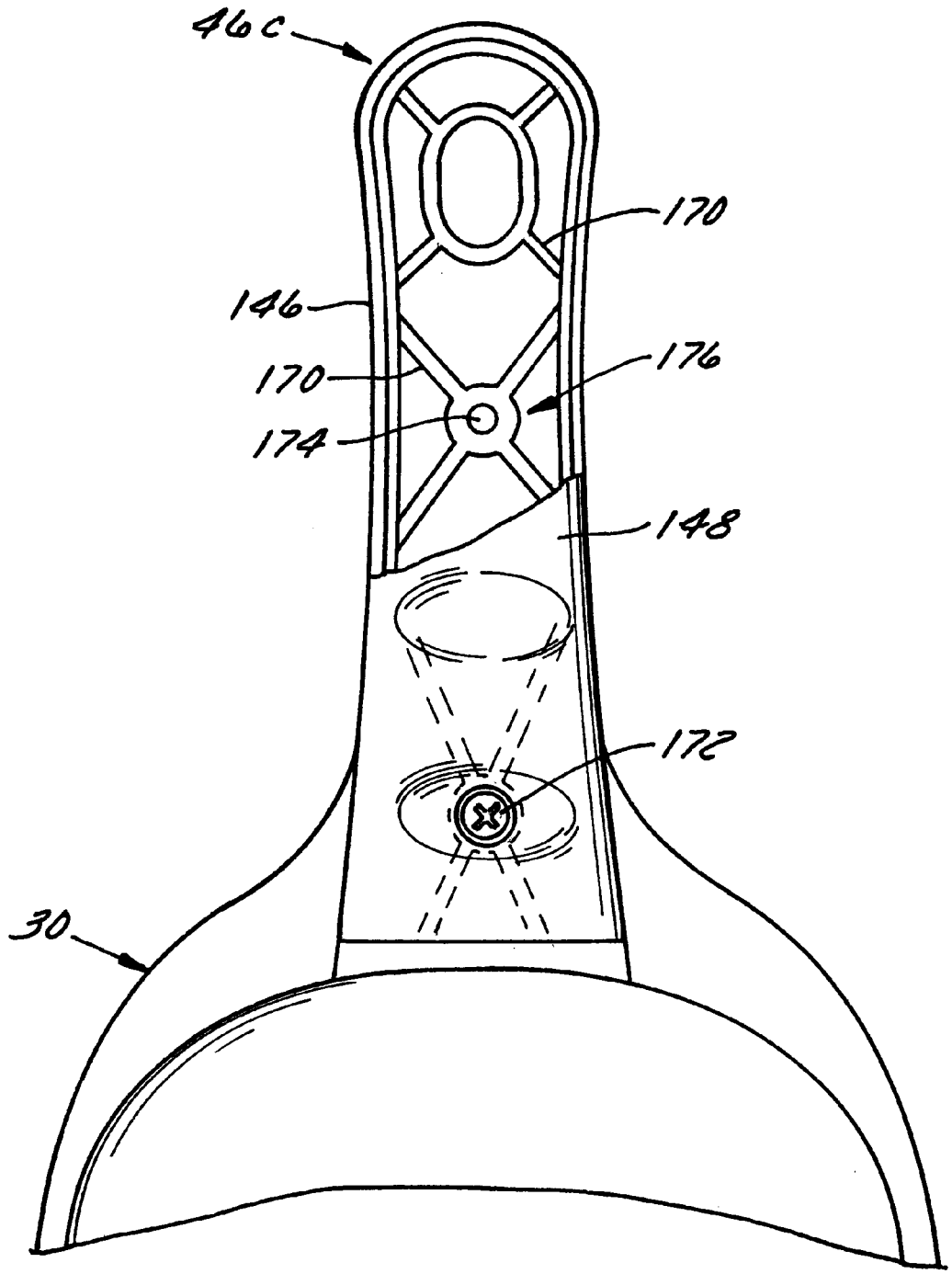
FIG. 17 is a fragmentary top plan view of a still further preferred scoop handle embodiment.

FIGS. 16 and 17 illustrate a third preferred handle assembly 46c. The cover 148 includes a plurality of longitudinally spaced apart bores 171. A rivet 172 or other similar type of fastener is received through each bore and has a free end that engages some part of the interior of the shank 146. Referring to FIG. 17, the end of each rivet 172 is received in a bore 174 in a receptacle 176 inside the shank 146 that is sized to capture and retain one end of the rivet 172. For example, the rivet 172 and receptacle 176 preferably are constructed and arranged to produce a friction fit, tight fit, or interlocking fit therebetween. In assembly, the cover 148 is positioned such as in the manner shown in FIG. 16 and a rivet 172 is inserted into each bore in the cover. The cover 148 and each rivet 172 are brought toward the interior of the shank 146 such that each rivet 172 is received in a corresponding receptacle 176. Each rivet 172 is urged into its corresponding receptacle 176 until it engages the receptacle 176 such that its removal is opposed.

Where the handle 46 is of two piece construction, assembly of the hand grip cover 148 to the shank 146 can be accomplished in other ways as well. For example, the cover 148 can be welded, glued, or attached in some other manner. If desired, the cover 148 can be connected by a living hinge (not shown) to the shank 146. Such a construction preferably is accomplished by molding both the shank 146 and cover 148 substantially simultaneously using a single mold.

If desired, the handle 46 can be of one piece construction. For example, the handle 46 can be made of one piece construction using a gas-assist molding method.

Figure 18:
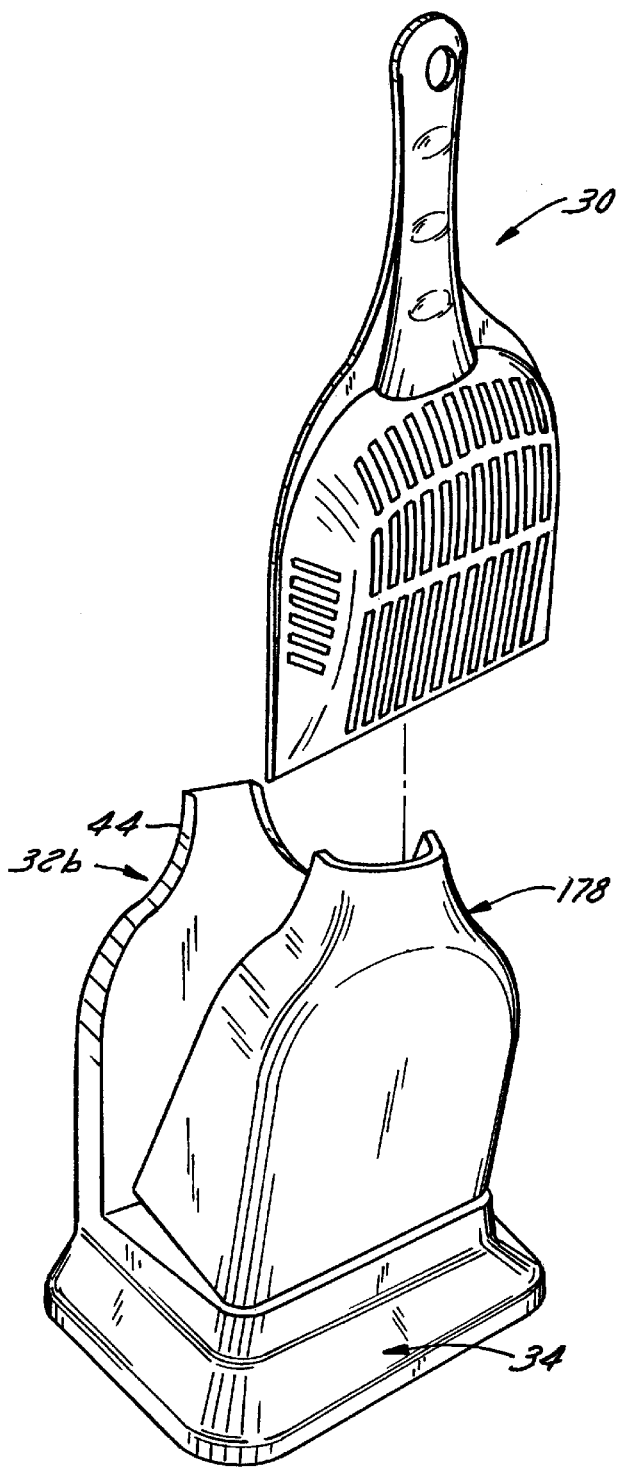
FIG. 18 illustrates an exploded perspective view of the scoop and a second preferred embodiment of the holder having a clamshell front scoop cover.
Figure 19:
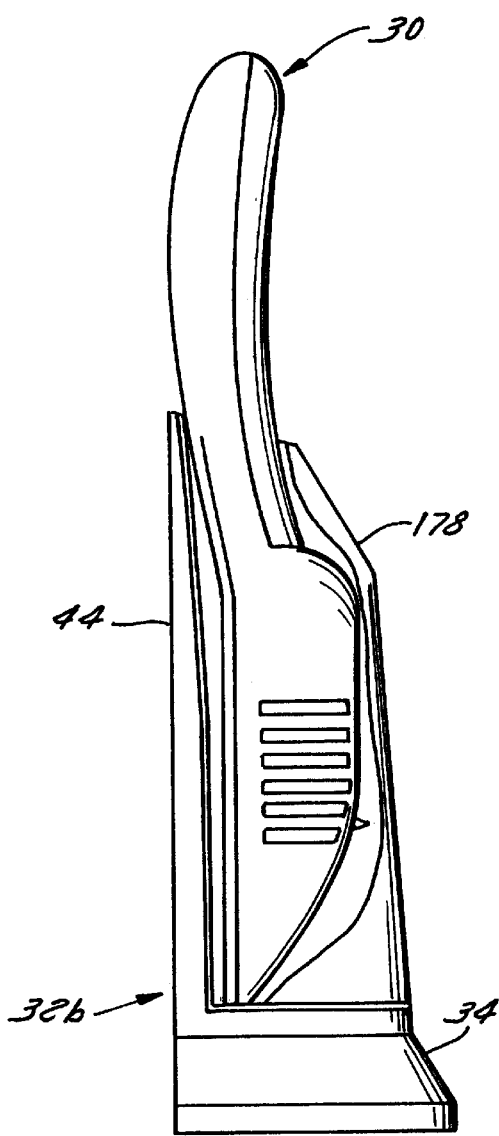
FIG. 19 is a side view of the scoop holder shown in FIG. 18 with a portion cutaway to show the scoop received in the holder.

FIGS. 18 and 19 illustrate a first preferred embodiment of a scoop holder 32b that has a front lid 178 that is pivotally attached to the holder 32b, such as by being hingably attached to its base 34. In one preferred embodiment, the lid 178 is attached to the base 34 by a living hinge. Such a lid 178 preferably covers the front scoop retaining wall 42 where the holder is equipped with such a retaining wall. In the preferred embodiment shown in FIGS. 18 and 19, the holder 32b is equipped with such a retaining wall 42 even though it is not shown. In another preferred embodiment, there is no retaining wall 42 and the lid 178 releasably captures the scoop 30 against the rear scoop retaining wall 44.

Figure 20:
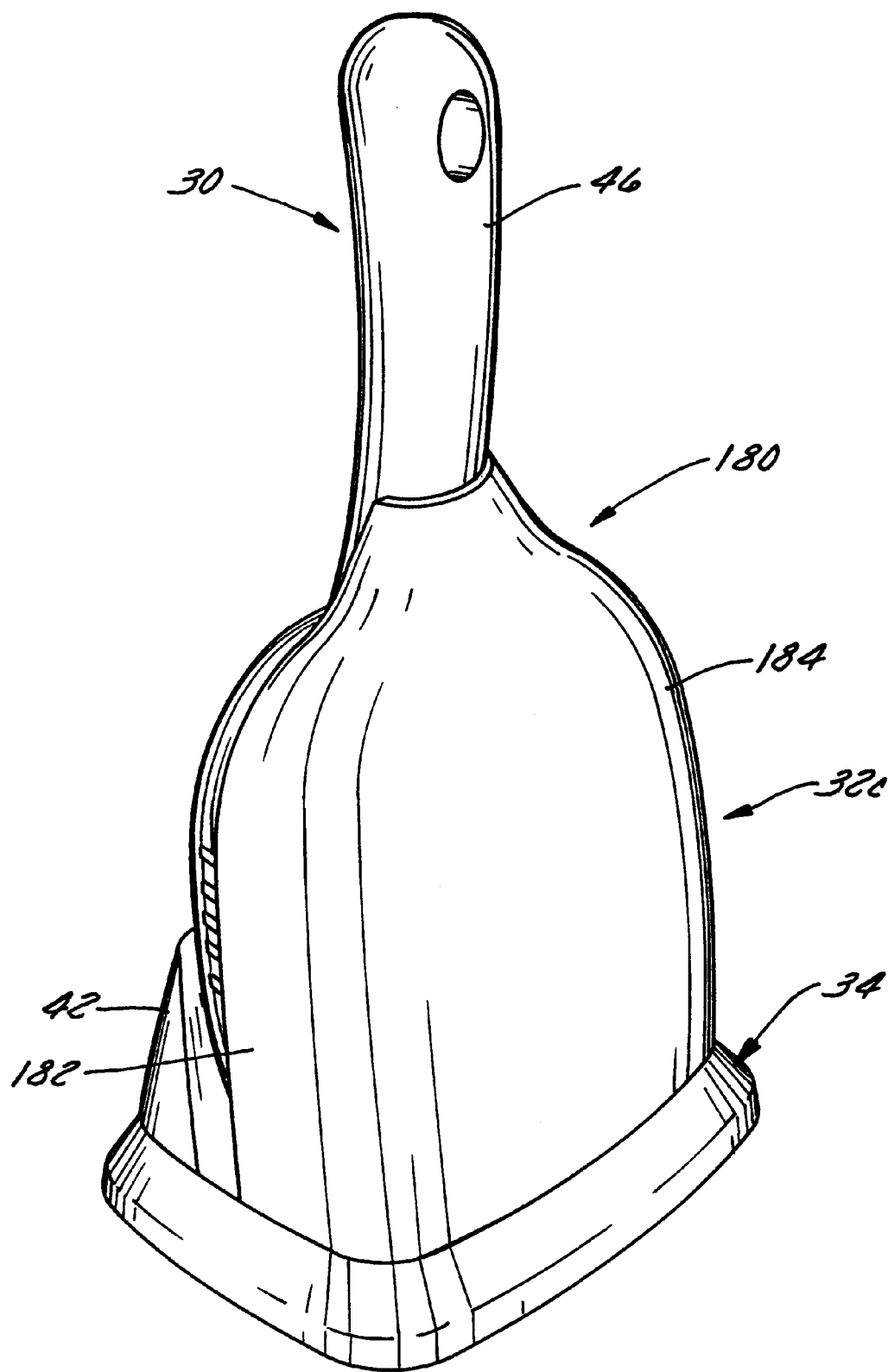
FIG. 20 is a perspective view of a third preferred scoop holder embodiment equipped with a front cover.

Referring to FIG. 20, which illustrates another scoop holder embodiment, reference numeral 180 corresponds to rear scoop retaining wall 44 of the scoop holder shown in FIG. 4 and is fixed in an upright position. The exterior of the retaining wall 180 preferably is three dimensionally contoured to provide a pleasing aesthetic appearance. Flanges 120 and 124 of the holder 32 shown in FIG. 5 have been replaced with curved inturned edges 182, 184. These curved inturned edges 182, 184 help guide the scoop 30 into the upright position shown in FIG. 20 when the scoop 30 is inserted into the holder 32c.

If desired, the scoop retaining wall 180 can comprise a hinged lid that is pivotally or hingedly attached to the base 34 of the holder. The lid 180 releasably captures the scoop 30 against scoop retaining wall 42. To remove the scoop 30, the lid 180 is pivoted away from the scoop 30 and the scoop 30 withdrawn. If desired, the handle 46 of the scoop 30 can be grasped and lifted to withdraw it from the holder 32b. As the scoop 30 is withdrawn, the lid 180 automatically displaces outwardly away from retaining wall 42 facilitating withdrawal.

The holder 32, as well as the bracket 38, preferably are made of a synthetic material that preferably comprises plastic. For example, in one preferred embodiment, the holder 32 and bracket 38 are both molded of plastic. If desired, for example, the holder 32 and/or the bracket 38 can be made of polypropylene, ABS, urethane, nylon, acetone, or a resin that preferably is resilient. If desired, the holder 32 and/or the bracket 38 can be made of a different material. For example, the holder 32 and/or the bracket 38 can be made of a metal, such as steel, aluminum, copper, or another type of metal or a metal alloy.

If desired, the scoop 30, as well as the holder 32, can be made of a material that is pathogen resistant. For example, the scoop 30 and/or the holder 32 can be made of an antibacterial material, such as MICROBAN, or the like.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A cat litter scoop holder for a cat litter scoop that has a perforate scoop portion and a handle, the cat litter scoop holder comprising:

a pedestal base;

a retainer lip extending upwardly from the base;

an upwardly extending rear wall that is spaced from the retainer lip;

wherein the retainer lip extends outwardly from adjacent the rear wall, and wherein the retainer lip and the rear wall define a scoop-receiving pocket;

a retention chamber formed on the underside of the holder; and bores formed in the bottom surface of the scoop-receiving pocket for permitting material to pass from the scoop-receiving pocket into the retention chamber.

2. The cat litter scoop holder of claim 1 wherein the base is disposed toward a generally horizontal surface, the pocket is vee-shaped and is configured and dimensioned to receive a cat litter scoop such that its longitudinal axis is generally vertical when it is received in the pocket.

3. The cat litter scoop holder of claim 1 wherein the pocket has a trough at its bottom that is perforate and that collects matter from a cat litter scoop when a cat litter scoop is received in the pocket.

4. The cat litter scoop holder of claim 3 wherein the trough is disposed adjacent an edge at a free end of a scoop portion of a cat litter scoop when a cat litter scoop is received in the pocket of the cat litter scoop holder.

5. The cat litter scoop holder of claim 3 wherein the base of the cat litter scoop holder includes a bottom upon which the cat litter scoop holder can be stood upright on a horizontal surface, the bottom includes a hollow that, together with the horizontal surface and the cat litter scoop holder, forms a retention chamber that receives matter from the scoop that has passed through the perforate trough.

6. The cat litter scoop holder of claim 1 further comprising an inclined skirt that extends outwardly from adjacent the retainer lip to a pedestal that prevents tipping of the cat litter scoop holder when it is disposed upright on a generally horizontal surface.

7. The cat litter scoop holder of claim 1 further comprising a bracket that removably mounts the cat litter scoop holder to a generally vertical surface, the bracket comprising a spacer that spaces the cat litter scoop holder from the vertical surface, a mounting tab that is used to mount the bracket to the vertical surface, and a pair of spaced apart fingers that each engage the cat litter scoop holder to releasably attach the cat litter scoop holder to the bracket.

8. The cat litter scoop holder of claim 1 wherein the cat litter scoop holder has a pair of spaced apart sidewalls disposed on or adjacent the pocket with each sidewall including an opening therein that promotes ventilation through the cat litter scoop when the cat litter scoop is received in the pocket.

9. The cat litter scoop holder of claim 8 wherein each sidewall opening is generally vee-shaped.

10. The cat litter scoop holder of claim 9 wherein the pocket is generally vee-shaped to receive the cat litter scoop.

11. The cat litter scoop holder of claim 10 wherein the pocket and each sidewall opening has an apex disposed adjacent the base and each sidewall further comprises a flange that truncates the apex of each sidewall opening and constrains side-to-side movement of the cat litter scoop when the cat litter scoop is received in the pocket.

12. The cat litter scoop holder of claim 11 further comprising a spacer disposed adjacent the apex of the pocket and that extends inwardly from the rear wall of the cat litter scoop holder.

13. The cat litter scoop holder of claim 11 wherein the cat litter scoop holder further comprises a spacer in the pocket that is disposed adjacent the apex of the pocket and that extends inwardly from the rear wall to keep a cat litter scoop in an upright position when a cat litter scoop is received in the pocket.

14. The cat litter scoop holder of claim 1 wherein the rear wall further comprises an inturned flange disposed on either side of the cat litter scoop when the cat litter scoop is received in the pocket and each inturned flange limits side-to-side movement of the cat litter scoop.

15. The cat litter scoop holder of claim 1 wherein (a) the rear wall further comprises a pair of spaced apart flanges that are each inturned toward the retainer lip with one of the inturned flanges disposed on one side of the cat litter scoop when the cat litter scoop is received in the pocket and the other one of the inturned flanges disposed on another side of the cat litter scoop when the cat litter scoop is received in the pocket, and (b) the inturned flanges limit side-to-side movement of the cat litter scoop when the cat litter scoop is received in the pocket to help keep the cat litter scoop in an upright position.

16. The cat litter scoop holder of claim 15 further comprising a pair of spaced apart sidewalls that each have an opening therein with one of the sidewalls disposed adjacent one side of the pocket and the other one of the sidewalls disposed adjacent the other side of the pocket, wherein the pocket has a generally triangular cross section with an apex adjacent the base, wherein one of the sidewalls includes a flanged portion disposed on one side of the pocket adjacent the apex, wherein the other one of the sidewalls includes a flanged portion disposed on the opposite side of the pocket adjacent the apex, and wherein the flanged portions also help limit side-to-side movement of a cat litter scoop received in the pocket.

17. A cat litter scoop holder for a cat litter scoop that has a perforate scoop portion and a handle, the cat litter scoop holder comprising:
 a base upon which the cat litter scoop holder can stand upright on a generally horizontal surface;
 a rear wall that has a pair of inturned flanges;
 an outwardly inclined retainer wall that extends outwardly from adjacent the rear wall; wherein the retainer wall and the rear wall define a scoop-receiving pocket that orients a cat litter scoop received in the pocket in an upright position with its handle extending upwardly beyond the pocket; and
 wherein one of the flanges of the rear wall is disposed on one side of the cat litter scoop and is curved and generally follows a part of the outer peripheral contour of the scoop portion when the scoop is received in the pocket of the cat litter scoop holder and the other one of the flanges of the rear wall is disposed on the other side of the cat litter scoop and is curved and generally follows another part of the outer peripheral contour of the scoop portion when the scoop is received in the pocket of the cat litter scoop holder.

18. The cat litter scoop holder of claim 17 wherein the base, the rear wall, and the retainer wall are comprised of molded plastic.

19. The cat litter scoop holder of claim 17 further comprising a spacer disposed in the pocket that bears against a cat litter scoop received in the pocket to help orient the cat litter scoop in an upright position.

20. A cat litter scoop holder for a cat litter scoop that has a perforate scoop portion and a handle, the cat litter scoop holder comprising:
 a base upon which the cat litter scoop holder can stand upright on a generally horizontal surface;
 a rear wall that has a pair of inturned flanges
 an inclined retainer wall that extends outwardly from adjacent the rear wall;
 wherein the retainer wall and the rear wall define a scoop-receiving pocket; and
 a bracket that releasably engages the rear to releasably mount the cat litter scoop holder to the wall; and
 wherein one of the flanges is disposed on one side of the cat litter scoop and is curved and generally following a part of the outer peripheral contour of the scoop portion when the scoop is received in the pocket of the cat litter scoop holder and the other one of the flanges is disposed on the other side of the cat litter scoop and is curved and generally following another part of the outer peripheral contour of the scoop portion when the scoop is received in the pocket of the cat litter scoop holder.

21. A cat litter scoop holder for a cat litter scoop, the cat litter scoop holder comprising:
 pedestal base;
 a retainer lip extending upwardly from the base;
 an upwardly extending rear wall that is spaced from the retainer lip, wherein the rear wall has a height that is higher than a height of the retainer lip;
 wherein the retainer lip and the rear wall define a pocket that is dimensioned and configured to receive a cat litter scoop;
 a retention chamber formed on the underside of the holder; and
 bores formed in the bottom surface of the scoop-receiving pocket for permitting material to pass from the scoop-receiving pocket into the retention chamber.

22. The cat litter scoop holder of claim 21, wherein the rear wall has a pair of inturned flanges with one of the flanges disposed along substantially the entire length of one side of the rear wall and the other one of the flanges disposed along substantially the entire length of the other side of the rear wall.

23. The cat litter scoop holder of claim 21, wherein the retainer lip does not move in relationship to the rear wall when a cat litter scoop is inserted or removed from the pocket.

24. A cat litter scoop holder for a cat litter scoop, the cat litter scoop holder comprising:
 a pedestal base;
 a retainer lip extending upwardly from the base;
 an upwardly extending rear wall that is spaced from the retainer lip and that has a pair of inturned flanges with one of the flanges disposed along substantially the entire length of one side of the rear wall and the other one of the flanges disposed along substantially the entire length of the other side of the rear wall;
 wherein the retainer lip and the rear wall define a scoop-receiving pocket;
 a retention chamber formed on the underside of the holder; and
 bores formed in the bottom surface of the scoop-receiving pocket for permitting material to pass from the scoop-receiving pocket into the retention chamber.

25. A cat litter scoop holder for a cat litter scoop, the cat litter scoop holder comprising:
 a pedestal base;

an outwardly inclined retainer wall that extends outwardly from adjacent the rear wall;

an upwardly extending rear wall that is spaced from the retainer lip;

wherein the retainer lip and the rear wall define a scoop-receiving pocket;

a retention chamber formed on the underside of the holder; and bores formed in the bottom surface of the scoop-receiving pocket for permitting material to pass from the scoop-receiving pocket into the retention chamber.

26. The cat scoop holder of claim 25, wherein the retainer wall has a generally triangular cross section.

\* \* \* \* \*

(12) EX PARTE REEXAMINATION CERTIFICATE (5970th)
United States Patent
Lipscomb et al.

(10) Number: US 6,578,807 C1
(45) Certificate Issued: Oct. 23, 2007

(54) CAT LITTER SCOOP HOLDER AND SCOOP

(75) Inventors: John M. Lipscomb, Cedarburg, WI (US); Timothy B. Strandell, Racine, WI (US); Daniel J. De Lay, Waterford, WI (US)

(73) Assignee: G.H.L. International, Inc., Cedarburg, WI (US)

Reexamination Request:
No. 90/008,303, Oct. 24, 2006

Reexamination Certificate for:
Patent No.: 6,578,807
Issued: Jun. 17, 2003
Appl. No.: 09/871,851
Filed: Jun. 1, 2001

Related U.S. Application Data

(60) Provisional application No. 60/208,998, filed on Jun. 1, 2000.

(51) Int. Cl.
*A47K 1/08* (2006.01)

(52) U.S. Cl. .................................................. 248/314
(58) Field of Classification Search .................. 206/349
See application file for complete search history.

(56) References Cited

U.S. PATENT DOCUMENTS

| | | | | |
|---|---|---|---|---|
| 1,102,284 A | * | 7/1914 | Miller | 206/362 |
| 4,473,152 A | * | 9/1984 | Jump et al. | 206/209.1 |
| D276,291 S | | 11/1984 | Boroch | |
| 5,127,521 A | * | 7/1992 | Bourque | 206/362.1 |
| D356,893 S | * | 4/1995 | Conmy | D4/116 |
| 5,460,293 A | * | 10/1995 | Erickson | 220/735 |

* cited by examiner

*Primary Examiner*—Bibhu Mohanty

(57) ABSTRACT

A cat litter scoop holder that includes scoop retaining walls that define a pocket for receiving a cat litter scoop. The holder includes a base upon which it sets upright. Its sides can be open to promote airflow. The pocket includes a drain. The base preferably is hollow such that it forms a chamber with the floor to help retain drainage. The holder preferably includes flanges disposed on each side of the scoop to help keep it in the pocket and constrain lateral scoop movement. One wall preferably is inclined such that it forms an acute included angle with the other wall such that a pocket of vee-shaped cross section having its apex adjacent the base is formed. This pocket construction helps keep the scoop upright. The holder can include a hinged lid that can function as a retaining wall.

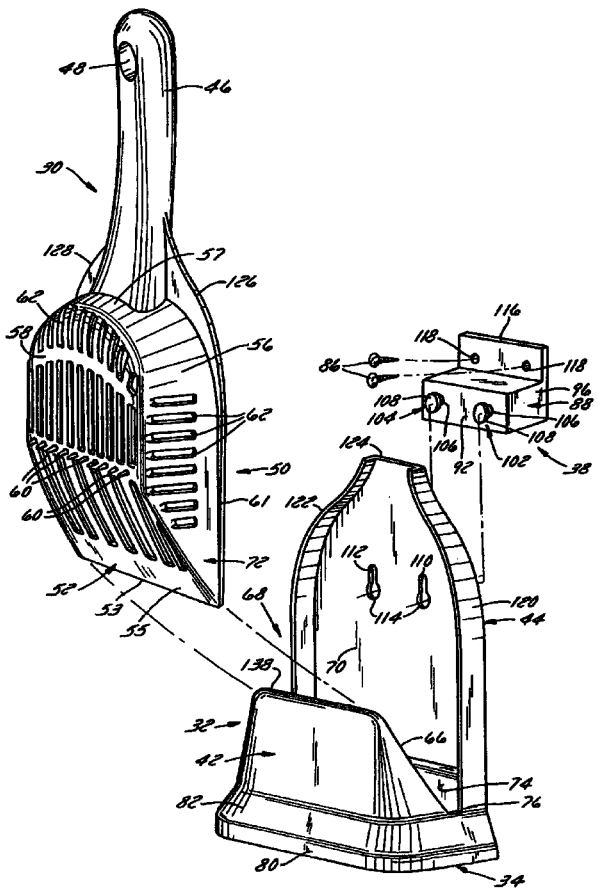

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 19 is confirmed.

Claims 17–18 and 20 are cancelled.

Claims 1–16 and 21–26 were not reexamined.

\* \* \* \* \*